United States Patent Office 2,864,805
Patented Dec. 16, 1958

2,864,805

EPOXIDE RESINS

Harold G. Cooke, Jr., Louisville, Ky., assignor to Devoe & Raynolds Company, Inc., Louisville, Ky., a corporation of New York No Drawing. Application December 5, 1955
Serial No. 550,841

8 Claims. (Cl. 260—47)

This invention relates to the manufacture of epoxide resins which are useful in the coating, molding, adhesive and other fields, and includes the new epoxide resins and the process of producing them, and compositions and products made therewith.

The new epoxide resins of the present invention are produced from a mixture of cyanuric acid and a polyhydric phenol by a two-stage process in which a mixture of cyanuric acid and a polyhydric phenol is first reacted with epichlorhydrin in the presence of a catalyst to form polychlorhydrin derivatives, which are then subjected to dehydrohalogenation to form the epoxide resins. The products produced will vary from products which are liquid and largely monomeric in character to products of a greater or less degree of polymerization.

The proportions of cyanuric acid and of polyhydric phenol used in the process, and for producing the new composite products, can be widely varied, e. g., from 85 parts of cyanuric acid and 15 parts of dihydric phenol to 3 parts of cyanuric acid and 97 parts of dihydric phenol.

In the first step of the process, in which a mixture of polyhydric phenol, and particularly of dihydric phenol, with cyanuric acid is reacted with epichlorhydrin in the presence of a catalyst, an organic solvent is also used. The epichlorhydrin reacts with both the dihydric phenol and the cyanuric acid to form polychlorhydrin derivatives.

The proportions of epichlorhydrin used can be varied. For products which are monomeric or largely monomeric in character, at least 3 mols of epichlorhydrin are used for each mol of cyanuric acid, and at least 1 mol of epichlorhydrin for each of the phenolic hydroxyls of the polyhydric phenol. In the production of polymeric products, somewhat lower proportions can be used.

A particularly advantageous method of carrying out the process, however, is the use of a large excess of epichlorhydrin, which also serves as the organic solvent, in the first step of the process, since the use of such a large excess results in the production of products which are largely monomeric in character and which, on dehydrohalogenation, give liquid or low melting epoxide resins which are largely monomeric in character or of only a limited degree of polymerization or condensation.

With lower ratios of epichlorhydrin to cyanuric acid and dihydric phenol an inert organic solvent is used in the first step of the process, and condensation or polymerization tends to take place to a somewhat greater extent and to give polychlorhydrin products of the first step which, on dehydrohalogenation, give polymeric resins of higher melting points.

Products of varying properties, from liquid to high melting point epoxide resins, can thus be produced by varying the proportion of cyanuric acid and dihydric phenol in the first step of the process and also by varying the proportion of epichlorhydrin used in the first step of the process. In general, as the ratio of cyanuric acid to dihydric phenol increases, the resulting epoxide resins will become harder and more brittle.

The reaction is carried out by heating the reaction mixture at reflux temperature over a period of time varying from about one-half hour to about six hours, depending upon the proportions of the reactants.

The catalysts which have been found advantageous for use in this reaction include tertiary amines such as tripropyl amine and dimethyl aniline; quaternary ammonium hydroxides, such as benzyl trimethyl ammonium hydroxide; quaternary ammonium salts, such as benzyl trimethyl ammonium chloride; and quarternary ammonium ion-exchange resins.

During this first step of the process, some dehydrohalogenation may take place to form epoxide groups that react with cyanuric acid groups or with hydroxyl groups of the dihydric phenol, with resulting formation of polymeric products or inter-reaction products, in which the cyanuric acid residues or the dihydric phenol residues are joined together or with each other through

$$-CH_2-CHOH-CH_2-$$

groups. With lower proportions of epichlorhydrin to cyanuric acid and dihydric phenol and with the use of an inert organic solvent, polymerization tends to take place to a somewhat greater extent than when a large excess of epichlorhydrin is used as the solvent.

With the use of an excess of epichlorhydrin, monomeric products such as triglycidyl cyanurate and diglycidyl ethers of the dihydric phenol will form to a considerable extent, and the resulting products may be largely monomeric in character. Further reaction of condensation or polymerization may also take place, and the extent to which it takes place is greater where a large excess of epichlorhydrin is not used.

Cyanuric acid has only a limited solubility in most organic solvents. But when it is admixed with a dihydric phenol and with epichlorhydrin and an organic solvent, which may be an excess of epichlorhydrin, the finely divided cyanuric acid in suspension gradually and progressively dissolves and reacts to form polychlorhydrin cyanurates or reaction products with the dichlorhydrin ethers of the dihydric phenols or with epoxide groups that may be formed by dehydrohalogenation during the first step of the process to form polychlorhydrin reaction products which are soluble in the solvent. Accordingly, the simultaneous reaction of cyanuric acid and a polyhydric phenol with epichlorhydrin in the presence of a catalyst gives a mixed or composite product containing polychlorhydrin derivatives which may be monomeric or polymeric and which may be composite in character, containing both cyanuric acid and polyhydric phenol nuclei.

The second step of the process is the dehydrohalogenation of the polychlorhydrin derivatives produced by the first step. This dehydrohalogenation of the polychlorhydrin derivative is effected with the use of basic reagents, and advantageous with the use of either anhydrous sodium hydroxide or an aqueous solution of sodium hydroxide. Other basic reagents such as potassium hydroxide, calcium hydroxide, sodium carbonate, etc., can also be used in this step. The reaction of dehydrohalogenation is slightly exothermic, but can be controlled and kept below 100° C. by cooling means such as indirect cooling by water. Water present in the reaction mixture is removed during or immediately following the dehydrohalogenation, by distillation of a part of the solvent. By-product salt and unreacted alkali are removed by filtration, and the product is isolated by removal of the solvent by vacuum distillation.

The epoxide resins thus obtained are polyglycidyl derivatives which will vary, depending upon the proportions of cyanuric acid and dihydric phenol used, and also with the excess of epichlorhydrin used, from polyglycidyl derivatives which are liquids or low melting point solids and which are largely monomeric in character or contain considerable amounts of monomeric products, such as polyglycidyl cyanurates and diglycide ethers of dihydric phenols, together with varying amounts of products of further reaction or condensation or polymerization, to include high melting point solid epoxide resins.

The composite epoxide resin products thus produced will thus vary from liquid to high melting point solids and will also vary in their epoxide equivalents, depending upon the extent to which the polymeric products or complex reaction products may be present in admixture with the monomeric products.

The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

The present invention makes it possible to produce composite products from the reaction of cyanuric acid and dihydric phenol in varying proportions, which vary from products which can be considered largely dihydric phenol epoxide resins modified with a small amount of glycidyl cyanurate or reaction products thereof, to products which can be considered largely polyglycidyl cyanurates modified with a small amount of diglycidyl ethers of dihydric phenols and reaction products thereof, and including composite products containing both the cyanuric acid nucleus and the dihydric phenol nucleus in the same molecule. As the ratio of cyanuric acid to dihydric phenol initially used increases, epoxide resins are produced which, when cured, become harder and more brittle.

The composite epoxide resins of the present invention have the advantage as epoxide resins that they are polyfunctional and in general contain an average of more than 2 epoxide groups per molecule. Polymeric products present in the composite resins will contain intermediate alcoholic hydroxyl groups.

Because of their polyfunctional reactive properties due to the number of reactive epoxide groups, these products are advantageously used for reaction with other compounds containing active hydrogen, to form higher molecular weight or cross-linked compounds including infusible and insoluble reaction products.

Epoxide resins produced by the two-step process may contain varying amounts of chlorine, depending upon the extent to which the dehydrohalogenation is carried. The chlorine content of products produced by a single dehydrohalogenation treatment can be reduced by one or more subsequent treatments to give products of lower chlorine content and somewhat lower epoxide equivalent.

The new epoxide resins are valuable epoxide resins which can be used for many purposes. They can be converted into molded or final insoluble and infusible products, by heating in the presence of a catalyst, e. g., an amine catalyst, much the same as epoxide resins made from dihydric phenols. They have the advantage over epoxide resins made from dihydric phenols alone that they have increased functionality and a higher ratio of epoxide groups per molecule.

Higher melting point epoxide resins can readily be produced from the liquid or low melting point resins by reacting them with further small amounts of dihydric phenol or of cyanuric acid.

The invention will be further illustrated by the following specific examples, but it will be understood that the invention is not limited thereto. In the examples, the parts are by weight. The apparatus used in carrying out the process of the examples was a three-necked, round-bottom flask equipped with thermometer, agitator, and reflux condenser.

The first seven examples illustrate the production of liquid or low melting point epoxide resins which are monomeric or largely monomeric in character, with the use of a large excess of epichlorhydrin as the organic solvent and with varying ratios of cyanuric acid and dihydric phenol.

*Example 1.*—A mixture of 228 parts (1 mol) of bisphenol, 16.5 parts (0.128 mol) of cyanuric acid, 1040 parts (11.28 mols) of epichlorohydrin and 6.3 parts of a 60% aqueous solution of benzyltrimethyl ammonium chloride was heated to 100° C. and held at 98 to 100° C. for 2¼ hours. At this time all the cyanuric acid had dissolved and the reaction mixture was cooled.

At 48° C. 100 parts of flake sodium hydroxide was added and the temperature was raised to 75° C. A mixture of water and epichlorohydrin was removed by vacuum distillation at a temperature of 58 to 75° C. over a period of 12 minutes. Salt and unreacted alkali were removed by filtration and the remaining epichlorohydrin was removed by vacuum distillation.

The product, 343 parts, was a viscous liquid having a softening point of 13° C., a chlorine content of 0.8% and an epoxide equivalent of 181.5. The product was obtained with a yield of 91% of theory.

*Example 2.*—A mixture of 228 parts (1 mol) of bisphenol, 49.5 parts (0.376 mol) of cyanuric acid, 1270 parts (13.76 mols) of epichlorohydrin and 7.6 parts of a 60% aqueous solution of benzyltrimethyl ammonium chloride was heated to 100° C. and held at 97 to 100° C. for 2¼ hours.

The reaction mixture was cooled to 46° C. and 130 parts of flake sodium hydroxide was added. The temperature was raised to 75° C. and, under partial vacuum, a mixture of water and epichlorohydrin was removed by distillation at 58 to 80° C. The salt was removed by filtration and the remaining excess epichlorohydrin was removed by vacuum distillation.

The product, 440 parts, was a viscous liquid having a softening point of 22° C., a chlorine content of 2.6% and an epoxide equivalent of 179.5

The product was obtained in a yield of 97.2% of theory.

*Example 3.*—A mixture of 114 parts (0.5 mol) of bisphenol, 74 parts (0.57 mol) of cyanuric acid, 1260 parts (13.6 mols) of epichlorohydrin and 5.7 parts of a 60% aqueous solution of benzyltrimethyl ammonium chloride was heated to 100° C. and held at 98 to 100° C. for 2½ hours.

The reaction mixture was cooled to 40° C. and 110 parts of flake sodium hydroxide was added. The temperature was raised to 53° C. and under partial vacuum a mixture of water and epichlorohydrin was removed by distillation at 53 to 70° C. The salt was removed by filtration and the remaining epichlorohydrin was removed by vacuum distillation.

The product (321 parts) had a softening point of 36° C., a chlorine content of 2.4% and an epoxide equivalent of 166.

The product was obtained in a yield of 94.5% of theory.

*Example 4.*—A mixture of 228 parts (1 mol) of bisphenol, 7.8 parts (0.06 mol) of cyanuric acid, 980 parts (10.6 mols) of epichlorohydrin and 6 parts of a 60% aqueous solution of benzyltrimethyl ammonium chloride was heated to 100° C. and held at 97 to 100° C. for 2½ hours.

The reaction mixture was cooled to 40° C. and 90 parts of flake sodium hydroxide was added. The temperature was raised to 70° C. and under partial vacuum a mixture of water and epichlorohydrin was removed by distillation at 82–91° C. The salt was removed by filtration and the remaining epichlorohydrin was removed by vacuum distillation.

The product, 357 parts, had a softening point of 13° C., a chlorine content of 1.1% and an epoxide equivalent of 186. The product was obtained in a 100% yield.

*Example 5.*—A mixture of 64.5 parts (0.5 mol) of cyanuric acid, 11.1 parts (0.0475 mol) of bisphenol, 780 parts (8 mols) of epichlorohydrin and 2.75 parts of a 60% aqueous solution of benzyltrimethyl ammonium chloride was heated to 115° C. and held at 114 to 115° C. for 1½ hours.

The reaction mixture was cooled to 33° C. and 32.8 parts of flake sodium hydroxide was added. The temperature was raised to 60° C. and held at 60 to 65° C. for 15 minutes. At 65° C. a second portion of 32.8 parts of flake sodium hydroxide was added and an exothermic reaction raised the temperature to 85° C. Heat was applied and a mixture of epichlorohydrin and water was distilled to a pot temperature of 105° C. The mixture was cooled and filtered to remove salt, and the remaining epichlorohydrin was removed by vacuum distillation.

The product, 160 parts, had a softening point of 48° C., a chlorine content of 4.25% and an epoxide equivalent of 158. The product was obtained in a 97% yield.

*Example 6.*—A mixture of 110 parts (1 mol) of resorcinol, 97 parts (0.75 mol) of cyanuric acid, 1620 parts (17.5 mols) of epichlorohydrin and 7.4 parts of a 60% aqueous solution of benzyltrimethyl ammonium chloride was heated to 115° C. and held at 114–115° C. for 2 hours.

The mixture was cooled to 58° C. and 4 equal portions of 43.5 parts of flake sodium hydroxide were added over an interval of 1 hour at a temperature of 58–60° C. Following the last addition of sodium hydroxide, heat was applied and a mixture of water and epichlorohydrin was distilled to a pot temperature of 105° C. The mixture was cooled and filtered and the excess epichlorohydrin was removed from the filtrate by vacuum distillation.

The product, 458 parts, was a viscous liquid having a softening point of 16° C., a chlorine content of 3.9% and an epoxide equivalent of 146.

The product was obtained with a yield of 100%.

*Example 7.*—A mixture of 34.2 parts (0.137 mol) of "Bisphenol-S" (p,p'-dihydroxydiphenyl sulfone), 64.5 parts (0.5 mol) of cyanuric acid, 826 parts (8.9 mols) of epichlorohydrin and 3.3 parts of a 60% aqueous solution of benzyltrimethyl ammonium chloride was heated to 113° C. and held at 113–115° C. for 3 hours.

The reaction mixture was cooled to 48° C. and 73 parts of flake sodium hydroxide was added. An exothermic reaction raised the temperature to 80° C. and heat was applied to distill a mixture of water and epichlorohydrin to a pot temperature of 105° C. The mixture was cooled and filtered and the excess epichlorohydrin was removed by vacuum distillation.

The product, 199 parts, had a softening point of 46° C., a chlorine content of 4.3% and an epoxide equivalent of 168.

In the above examples, the molecular ratio of cyanuric acid to dihydric phenol used varies from about 10 to 1 in Example 5 to about 1 to 17 in Example 4. On the assumption that the cyanuric acid is converted into monomeric triglycidyl cyanurate present either as such or in part as a product of further reaction or condensation, with either cyanuric acid or dihydric phenol, the percentage of glycidyl cyanurate, on that basis, would vary from around 90% in Example 5 and 75% in Example 7 to about 50% in Examples 3 and 6, 25% in Example 2, 10% in Example 1, and 5% in Example 4.

In the following examples, an inert organic solvent is used with an amount of epichlorohydrin less than that corresponding to the OH groups of the dihydric phenol and cyanuric acid, and the products produced are higher melting epoxide resins of a polymeric nature.

*Example 8.*—A mixture of 228 parts (1 mol) of bisphenol, 43 parts (0.33 mol) of cyanuric acid, 195 parts (2.1 mols) epichlorohydrin, 400 parts of dioxane and 3.5 parts of a 60% aqueous solution of benzyltrimethyl ammonium chloride was heated to reflux for 1⅓ hours.

At this time all the cyanuric acid was dissolved and the mixture was cooled to 63° C., 86 parts of flake sodium hydroxide was added and the reaction temperature was kept below 90° C. with a cold water bath. When the exothermic reaction was complete, heat was applied and the mixture was held at reflux for ½ hour. The mixture was cooled to 80° C., filtered and the dioxane removed from the filtrate by vacuum distillation.

The product, 375 parts, had a softening point of 87° C., and an epoxide equivalent of 893. Yield 98% of theory.

*Example 9.*—A mixture of 114 parts (0.5 mol) of bisphenol, 32.3 parts (0.25 mol) of cyanuric acid, 115.6 parts (1.25 mols) of epichlorohydrin, 250 parts of dioxane and 6.2 parts of a 35% methanol solution of benzyltrimethyl ammonium hydroxide was heated to 100° C. and held at 100–102° C. for 2¼ hours.

The reaction mixture was cooled to 57° C. and 52 parts of flake sodium hydroxide was added. The mixture was heated to 93° C. and held at 93–97° C. for 30 minutes, cooled and filtered to give 380 parts of a solution having a viscosity of D, color of 4 and percent solids of 54.1%.

On a solids basis the product had a chlorine content of 1.97% and an epoxide equivalent of 520. The solvent was removed from a small sample of the solution in a vacuum oven at 95–100° C. to give a hard, brittle resin having a melting point of 115° C.

*Example 10.*—A mixture of 110 parts (1 mol) of resorcinol, 32.3 parts (0.25 mol) of cyanuric acid, 162 parts (1.75 mols) of epichlorohydrin, 250 parts of dioxane and 2.4 parts of dimethyl aniline was heated to 97° C. and held at 97 to 99° C. for 1½ hours.

The mixture was cooled to 55° C. and 72 parts of flake sodium hydroxide was added. The reaction mixture was heated to 90° C. and held at 90–96° C. for 35 minutes, cooled and filtered to give 425 parts of a solution having a viscosity of E, color of 11 and percent solids of 55%.

On a solids basis the product had a chlorine content of 2.28% and an epoxide equivalent of 787. The solvent was removed from a sample of the solution in a vacuum oven at 95–100° C. to give a resinous solid having a softening point of 72° C.

*Example 11.*—A mixture of 83.3 parts (0.33 mol) of "Bisphenol-S" (p,p'-dihydroxydiphenyl sulfone), 43 parts (0.33 mol) of cyanuric acid, 123.3 parts (1.33 mols) of epichlorohydrin, 250 parts of dioxane and 2 parts of benzyldimethyl amine was heated to 98° C. and held at 98 to 100° C. for 6 hours.

The reaction mixture was cooled to 55° C. and 55 parts of flake sodium hydroxide was added. The mixture was heated to 90° C. and allowed to reflux at 93 to 98° C. for 30 minutes, cooled and filtered to give a solution having a viscosity of C, color of 10 and percent solids of 52.1%.

On a solids basis the product had a chlorine content of 3.68% and an epoxide equivalent of 402. A small sample of the solution was treated in a vacuum oven at 95–100° C. to give a hard brittle resin having a softening point of 97° C.

The epoxide resins produced as above described, when liquid in character, can be used together with a catalyst as coating compositions, as adhesives, as molding liquids, etc., either alone or admixed with other materials. The solid resins can similarly be used in solution for forming coating compositions or in solid form for admixture with other materials, e. g., for making molded and other products.

In general, the improved resins of the present invention can be used to replace liquid and solid epoxide resins produced from dihydric phenols. But the resins have

I claim:

1. The method of producing epoxide resins which comprises reacting a mixture of cyanuric acid and a dihydric phenol with epichlorhydrin in the presence of an organic nitrogen base as a catalyst and an organic solvent for cyanuric acid to form polychlorhydrin derivatives, and subjecting the resulting chlorhydrin derivatives to dehydrohalogenation to form epoxide resins.

2. The method according to claim 1, in which a large excess of epichlorhydrin is used as the organic solvent.

3. The method according to claim 1 in which the dehydrohalogenation is effected by treatment with caustic alkali.

4. Composite epoxide resins resulting from the reaction of a mixture of cyanuric acid and dihydric phenol with epichlorhydrin in the presence of an organic solvent for cyanuric acid in proportions to form polychlorhydrin derivatives of the cyanuric acid and dihydric phenol and in the presence of an organic nitrogen base catalyst, followed by dehydrohalogenation of such polychlorhydrin derivatives.

5. Epoxide resins as defined in claim 4, in which the dihydric phenol used is bis-phenol.

6. Epoxide resins as defined in claim 4, produced by a process in which a large excess of epichlorhydrin is used as the solvent and which are liquid and largely monomeric in character.

7. Epoxide resins as defined in claim 4 which are solid and largely polymeric in character.

8. The method of producing epoxide resins which comprises reacting a mixture of cyanuric acid and a dihydric phenol with epichlorhydrin in the presence of a catalyst selected from the group which consists of tertiary amines and quaternary ammonium compounds.

References Cited in the file of this patent

UNITED STATES PATENTS 2,741,607     Bradley et al. _____ Apr. 10, 1956